(12) United States Patent
Williams et al.

(10) Patent No.: US 9,639,745 B2
(45) Date of Patent: May 2, 2017

(54) METHOD AND APPARATUS FOR EVALUATING RESULTS OF GAZE DETECTION

(71) Applicant: Sensomotoric Instruments Gesellschaft Für Innovative Sensorik Mbh, Teltow (DE)

(72) Inventors: Denis Williams, Berlin (DE); Jan Hoffmann, Berlin (DE)

(73) Assignee: Sensomotoric Instruments Gesellschaft Für Innovative Sensorik Mbh, Teltow (DE)

( * ) Notice: Subject to any disclaimer, the term of this patent is extended or adjusted under 35 U.S.C. 154(b) by 8 days.

(21) Appl. No.: 14/387,026

(22) PCT Filed: Mar. 21, 2013

(86) PCT No.: PCT/EP2013/055953
§ 371 (c)(1),
(2) Date: Sep. 22, 2014

(87) PCT Pub. No.: WO2013/139919
PCT Pub. Date: Sep. 26, 2013

(65) Prior Publication Data
US 2015/0063635 A1    Mar. 5, 2015

(30) Foreign Application Priority Data

Mar. 22, 2012 (EP) .................................... 12160878

(51) Int. Cl.
*G06K 9/00*         (2006.01)
(52) U.S. Cl.
CPC ....... *G06K 9/00335* (2013.01); *G06K 9/0061* (2013.01); *G06K 9/00597* (2013.01); *G06K 9/00604* (2013.01)

(58) Field of Classification Search
CPC ....................... G06K 9/00597; G06K 9/00604
See application file for complete search history.

(56) References Cited

U.S. PATENT DOCUMENTS 6,106,119 A * 8/2000 Edwards .............. A61B 3/0025
                                                            351/209
6,381,339 B1 * 4/2002 Brown .................... G06F 3/013
                                                            382/100

(Continued)

FOREIGN PATENT DOCUMENTS

CN          1723456 A       1/2006
CN        101382940 A       3/2009
(Continued)

OTHER PUBLICATIONS

"International Application No. PCT/EP2013/055953, English Translation of International Preliminary Report on Patentability dated Oct. 2, 2014", (Oct. 2, 2014), 9 pgs.

(Continued)

*Primary Examiner* — Kim Vu
*Assistant Examiner* — Molly Delaney
(74) *Attorney, Agent, or Firm* — Schwegman Lundberg & Woessner, P.A.

(57) ABSTRACT

The invention relates to a method and an apparatus for evaluating results of gaze detection, wherein these results are present or are obtained in the form of information which defines, for each of a multiplicity of successive times, a viewing direction detected at this time and a focal point identified thereby in a scene image assigned to this time. For this purpose, the invention provides for the following steps to be carried out: —a temporal change in the viewing direction and/or the focal point is evaluated in order to identify different viewing events which differ from one another by different speeds of an eye movement, wherein saccades and fixations and/or pursuit movements are (Continued)

detected as different types of viewing events and the identified viewing events are classified according to the type thereof, —a period of time spanned by the times is divided into intervals in such a manner that an interval corresponding to a duration of the particular viewing event is assigned to each of the identified viewing events, wherein at least some of these intervals each contain a sequence of a plurality of times, —precisely one of the times or a true subset of the times is selected in each case from each of the intervals assigned to a fixation or a pursuit movement, —and, for each of these selected times, the focal point identified in the scene image assigned to the particular time is mapped to a position corresponding to this focal point in a reference image.

19 Claims, 2 Drawing Sheets

(56) References Cited

U.S. PATENT DOCUMENTS

| | | | |
|---|---|---|---|
| 6,711,293 B1 | 3/2004 | Lowe | |
| 7,593,602 B2* | 9/2009 | Stentiford | G06F 17/30265 358/403 |
| 9,092,700 B2* | 7/2015 | Wang | G06K 9/78 |
| 2006/0050993 A1* | 3/2006 | Stentiford | G06F 17/30265 382/305 |
| 2012/0105486 A1* | 5/2012 | Lankford | G06F 3/013 345/661 |
| 2012/0154751 A1* | 6/2012 | Pelah | A61B 3/0041 351/224 |

FOREIGN PATENT DOCUMENTS

| | | |
|---|---|---|
| CN | 101943982 A | 1/2011 |
| CN | 102292017 A | 12/2011 |
| CN | 103823556 A | 5/2014 |
| WO | WO-2008097933 A1 | 8/2008 |
| WO | WO-2013/139919 | 9/2013 |

OTHER PUBLICATIONS

"International Application No. PCT/EP2013/055953, International Search Report mailed May 14, 2013 [with English translation]", (May 14, 2013), 5 pgs.

"International Application No. PCT/EP2013/055953, Written Opinion mailed May 14, 2013", (May 14, 2013), 7 pgs.

Hennessey, Craig, et al., "Fixation Precision in High-Speed Noncontact Eye-Gaze Tracking", IEEE Transactions on Systems, Man, and Cybernetics, Part B: Cybernetics, vol. 38, No. 2, Apr. 1, 2008, pp. 289-298, (Apr. 1, 2008), 289-298.

Letchford, Michael, "Eye Tracking in Shopper Insights—How Does it Work?", Retrieved from the Internet: URL:http://www.insightsinretail.com/biometrics-in-consumer-research/eye-tracking-does-it-improve-shopper-insights/ [retrieved on Sep. 11, 2012], (Sep. 11, 2012), 4 pgs.

Rajashekar, Umesh, et al., "Gaffe: A Gaze-Attentive Fixation Finding Engine", IEEE Transactions on Image Processing, vol. 17, No. 4, Apr. 1, 2008, pp. 564-573, (Apr. 1, 2008), 564-573.

Rothkopf, Constantin A., et al., "Head movement estimation for wearable eye tracker", ACM, 2 Penn Plaza, Suite 701, New York,. USA, Jan. 1, 2004, pp. 123-129, (Jan. 1, 2004), 123-129.

Van Der Lans, Ralf, et al., "Research Note: Competitive Brand Salience", Marketing Science. vol. 27, No. 5. Sep.-Oct. 2008, pp. 922-931, (Sep. 2008), 922-931.

Wedel, Michel, et al., "Eye Fixations on Advertisements and Memory for Brands: A Model and Findings", Marketing Science, vol. 19, No. 4, Oct. 2000, pp. 297-312, (Oct. 2000), 297-312.

"Chinese Application No. 201380026908.3, Office Action mailed Nov. 23, 2016", w/ English Translation, (Nov. 23, 2016), 29 pgs.

\* cited by examiner

METHOD AND APPARATUS FOR EVALUATING RESULTS OF GAZE DETECTION

PRIORITY CLAIM TO RELATED APPLICATIONS

This application is a U.S. national stage application filed under 35 U.S.C. §371 from International Application Serial No. PCT/EP2013/055953, which was filed Mar. 21, 2013, and published as WO 2013/139919 on Sep. 26, 2013, and which claims priority to European Patent Office Application No. 12160878.0, filed Mar. 22, 2012, which applications and publication are incorporated by reference as if reproduced herein and made a part hereof in their entirety, and the benefit of priority of each of which is claimed herein.

TECHNICAL FIELD

The present invention relates to a method and a device for evaluating results of eye detection, i.e. results of an eye tracking.

BACKGROUND OF THE INVENTION

Eye tracking is known per se and is used for example in behavioural research or market research when it is necessary to examine on what visual points a gaze of a person or even of an animal rests, when, how long and/or in what sequence, or how the gaze or a gaze direction moves between different visual points. This can give information for example about where and how a supplier should place goods for sale most favourably in order to be sure of the attention of the passers-by.

In the case of methods known from the state of the art for eye tracking, scene images are recorded which reproduce a scene which is visible for a test subject—the word can stand subsequently also both for a person and an animal in the present document—and for which purpose for example a camera, which is fixed on the head of the test subject and thus moves with the head, can be used. At the same time, an eye position and hence a gaze direction of the test subject is detected, which can take place for example with the help of cameras directed towards the eyes of the test subject using suitable image evaluation methods. After calibration of such an eye tracker, conclusions can then be made, even with changing eye positions and head positions, respectively about a visual point in the scene images, the term visual point—this applies also for the subsequent description of the invention and of the embodiments—designating a point in the scene image upon which the gaze of the test subject rests at a moment to which the scene image is assigned.

SUMMARY

Results of an eye tracking occur therefore typically as information which defines, for each of a large number of successive moments, respectively a gaze direction detected at this moment and a consequently identified visual point in a scene image assigned to this moment. In order to evaluate such results, an extremely large quantity of information needs to be processed because typically more than twenty scene images and image points are detected per second. Irrespective of whether the evaluation is effected manually, automatically or interactively, it is therefore associated with an extremely high time- or computing expenditure.

The object underlying the present invention is to propose measures with which the complexity for evaluating results of an eye tracking of the described type can be reduced.

This object is achieved according to the invention by a method having the features of the main claim and by a device having the features of the coordinated claim. Advantageous embodiments and developments of the invention are revealed by the features of the sub-claims.

The device according to the invention is suitable for implementation of the proposed method which is intended subsequently firstly to be described and with which a significant reduction in the complexity associated with evaluating the results of an eye tracking results. This method serves therefore for evaluating results of an eye tracking, these results being present or—e.g. in the previously described manner by eye tracking—being obtained as information which defines, for each of a large number of successive moments, respectively a gaze direction detected at this moment and a consequently identified visual point in a scene image assigned to this moment, the scene images being time-dependent so that different scene images are generally assigned to the different moments. This method comprises the following steps:

evaluating a temporal change in the gaze direction and/or in the visual point and/or in an eye movement for identifying different visual events, at least two different types of visual events being recognised and the identified visual events being classified according to their type, dividing a period of time comprising the moments into intervals such that an interval, which corresponds to a duration of the respective visual event, is assigned to each of the identified visual events, typically at least some of these intervals respectively comprising a sequence of a plurality of the moments, selecting respectively precisely one of the moments or a proper subset of the moments from each of the intervals which are assigned to a visual event of at least one selected type of visual event, and, for each of these selected moments, imaging the visual point identified in the scene image assigned to the respective moment, i.e. the visual point, defined by the results of the eye tracking for this moment, onto a position in a reference image corresponding to this visual point.

Division of the period of time into the temporal intervals can thereby be effected for example by an attribute, which indicates to which of the intervals or visual events this moment or the moment which is assigned to this scene image belongs, being assigned to each of the moments or scene images. Typically the intervals will be disjunctive. The reference image can be identical for the different scene images. However it is also possible that the reference image respectively is one from a sequence of reference images which can be defined for example by a reference video. Similarly to the scene images, also the reference image is time-dependent in this case.

It is particularly expedient if, during evaluation, in particular visual events in which information intake is effected, and visual events in which no information intake is effected, are recognised as different types of visual events—namely as visual events with information intake and as visual events without information intake. The above-mentioned visual events of the at least one selected type of visual events will then be the visual events with information intake. Selection respectively precisely of one of the moments or of a subset of the moments is then effected for instance generally in particular for each of the intervals which are assigned to a visual event in which information intake is effected.

Underlying the proposal for drastically reducing the complexity for the evaluation in this way are the following three insights. Firstly, it is important for many applications of eye tracking solely or primarily to determine when a test subject visually takes in what information. Secondly, at least one information intake which is relevant for the purposes of the proposed method takes place only during specific types of visual events, in particular during fixations or consequent movements in which the gaze rests more or less longer on an object which is stationary or moving relative to the test subject, however not for example in the case of saccades which represent a different type of visual event and in which an eye movement which is too rapid makes relevant information intake practically impossible in this sense. Thirdly, the gaze rests during a course of a visual event associated with information intake, such as a fixation or a consequent movement, always more or less on the same point or object so that it suffices, from each fixation or consequent movement, to examine the scene image assigned to this moment and the visual point identified therein, only for one moment in order to know everything necessary about the information intake during this visual event. For the presently described invention, it is moreover not absolutely necessary to differentiate fixations and consequent movements from each other. However, these are differentiated expediently at least from events without information intake, such as for example saccades.

Even when taking this knowledge into account, it is however not unimportant to avoid unnecessary complexity in the evaluation of the results of the eye tracking. This becomes possible firstly by the fact that, due to the evaluation of the temporal change in gaze direction and/or visual point and/or eye movement, different visual events—preferably visual events with information intake and visual events without information intake, i.e. for example saccades and fixations and/or consequent movements—are recognised as different types of visual events and the period of time comprising the moments is divided into intervals such that an interval which corresponds to a duration of the respective visual event is assigned to each of the identified visual events. Only as a result of this can respectively precisely one of the moments or a typical subset of the moments be selected from this interval from each of the intervals which are assigned to one visual event of the selected type—e.g. a visual event with information intake or for example a fixation or a consequent movement—and can it be ensured that evaluation of the scene images and visual points assigned to these moments suffices without risking undesired information loss.

It is thereby unnecessary to select more than one moment from the individual intervals. However, the latter can be advantageous for excluding or reducing errors or imprecisions which are possibly unavoidable with respect to the imaging, which takes place subsequently and is possibly implemented automatically, into the reference image. In every case, the number of selected moments and hence the imaging of visual points to be undertaken into the reference image is significantly less than the number of all the moments which are present for information about scene images and visual points.

Imaging of the visual points onto corresponding positions in the reference image ultimately makes systematic evaluation possible only because merely the positions determined herein comprise objective information about on what the gaze of the test subject has rested, when and for how long, if it has to be accepted that the test subject is moving and the scene images assigned to the different moments therefore differ from each other. A particular advantage is revealed now by the number of imagings to be implemented being able to be maintained within extremely narrow limits by the proposed procedure. The method can also provide that the visual behaviour of several test subjects who are observed in succession or simultaneously is analysed in the described manner. The imaging of the visual points into the reference image, which is chosen for this purpose preferably to be respectively the same for all test subjects, then makes possible a very objective evaluation of the test results with extremely low complexity.

It may be clarified that the terms used here in the context of identification and classification of the visual events, "visual events in which information intake is effected" or "visual events with information intake", on the one hand, and "visual events in which no information intake is effected" or "visual events without information intake", on the other hand, should not imply that it is examined directly respectively whether and to what degree the test subject actually takes in information during the visual event. It is merely meant therewith that different visual events which can be generally recognised from typical physiological or motor features are differentiated and that these visual events can be divided, on the basis of empirical evidence or plausible considerations, into those in which information intake can be expected and those in which—e.g. because of too great a movement speed—it can be assumed that at least no relevant information intake is effected. Thus, it can be assumed for example in this sense that, in the case of a fixation or a consequent movement, information intake is effected but not with a saccade. Typical physiological features in which the different types of visual events can be differentiated and by means of which they can be recognised, are for example a speed of the eye movement or a dimension of an angle range covered within a specific period of time. Naming the visual events with information intake and visual events without information intake is ultimately also not intended to imply that precisely these and only these two types of visual events are differentiated. Rather, it is possible that a larger number of different types of visual events is identified, which are assigned possibly also to a larger number of different classes which however can be interpreted respectively in the mentioned sense as one of possibly different conceivable visual events with or without information intake.

As emerges from what has already been stated, the different visual events can be differentiated from each other by different speeds and/or amplitudes of an eye movement. Correspondingly, identification of the different visual events can be effected for example by detection and evaluation of a speed and/or amplitudes of an eye movement. In addition, further information can be evaluated for this purpose, e.g. relating to an eye acceleration or an image content in the surroundings of the visual points in the scene images which can be subjected for this purpose to an image evaluation, or relating to a head movement which can be detected with a head tracker.

In particular in the case of expedient embodiments of the method, saccades are recognised as visual events in which no information intake is effected, whilst fixations and/or consequent movements can be recognised as visual events in which information intake is effected.

The method can be designed such that, for each of the intervals which are assigned to a visual event of a selected type—e.g. a visual event with information intake, for example a fixation or a consequent movement—a position in the reference image together with information about the duration of the respective visual event is stored as imaging target or "mapping end point". Provided precisely one of the moments is selected from this interval, this position can be chosen as the position onto which the visual point, which is defined for the moment selected from this interval, is imaged. If a plurality of moments is selected from this interval, this position can be chosen as one of the positions or a—not necessarily arithmetic—average or median of the positions onto which the visual points, which are defined for the moments selected from this interval, are imaged. In the just mentioned case, the imaging target can be chosen for example as the position onto which the visual point, which is defined for the last moment selected from this interval, is imaged or, in particular in the case of automatic imaging, as a function of a measure of the quality of the respective imaging. In addition to the information about the duration of the respective visual event, also further attributes with information about the visual event together with the position can be stored, e.g. a beginning and an end, a continuous number of the visual event or a meter reading in the case of multiple occurrence of the same position. All this information subsequently allows evaluation of the results of the eye tracking which can be extensively automated.

An embodiment in which the method serves not only for evaluation of the eye tracking but also for the eye tracking itself provides that the scene images at the mentioned moments are recorded with a camera, the gaze directions being detected by means of an eye tracker which determines the visual points in the scene images as a function of the information thus obtained about the gaze directions. The camera can thereby be worn by the head of the test subject whose gaze directions are detected by the eye tracker. The eye tracker can have for example eye cameras for observing respectively one of two eyes of the test subject and can provide an image evaluation. The latter can determine for example a pupil position relative to a reflection on a cornea of the respective eye. The two eye cameras can be retained together with the first-mentioned camera by a spectacle-like carrier for recording the scene images.

In expedient embodiments of the described evaluation, the reference image is an image of a scene visible in the scene images which corresponds to a fixed perspective and can be recorded photographically for example or can have a sketch character, or is an abstract reproduction or coding of characteristic features which can be detected in the scene images. Such an abstract reproduction or coding can be provided, for example for each characteristic feature which is intended to be taken into account, by naming or location definition of this feature.

It can be provided that, for each of the selected moments, respectively the scene image assigned to this moment is output together with the visual point identified therein, e.g. on a screen. This can be helpful for manual implementation, e.g. by mouse click, or for visual checking of the imaging of the visual point into the reference image. The reference image is likewise preferably output for this purpose and can be shown on the screen, for example next to or above or below the current scene image.

It should not be ruled out for the imaging of the image points to be implemented manually from the individual selected scene images into the reference image. However it is at least possible for the imaging of the visual points onto the positions and hence determination of the mentioned position to be effected automatically by identifying a plurality of characteristic features and locations of these features in the reference image by means of an algorithm for feature detection, identifying these features and determining locations of these features in the respective scene image by applying the same or a corresponding algorithm to the scene image, determining a transformation which images the locations of the features in the scene image onto the corresponding locations in the reference image, i.e. onto the locations of the respective features in the reference image, and applying this transformation to the visual point identified in the respective scene image.

The transformation can be determined for example with the subsidiary condition that it is a homography with the desired imaging properties. It can be determined also as spatial imaging. At least a part of the features can thereby be situated on the same scene object. The last three of the four steps mentioned here are thereby respectively implemented for each of the selected moments or for each of the scene images assigned to these moments. The characteristic features which are identified by the algorithm within the framework of an image evaluation can concern for example corners or lines. Corresponding algorithms for feature detection are known per se, e.g. from the publication U.S. Pat. No. 6,711,293 B1.

Also the selection of the moments can be effected both manually and automatically. Thus for example respectively one moment can be chosen which is defined by the fact that it is situated centrally in the respective interval.

As is revealed by what has been stated already, the proposed device is suitable for advantageously low-complexity evaluation of results of an eye tracking, these results being present or being able to be read in or produced as information which defines, for each of a large number of successive moments, respectively a gaze direction detected at this moment and a consequently identified visual point in a scene image assigned to this moment, the scene images being time-dependent so that different scene images are assigned generally to the different moments. For this purpose, this device is equipped by programming technology to implement the following steps:

evaluating a temporal change in the gaze direction and/or in the visual point and/or in an eye movement for identifying different visual events and recognising at least two different types of visual events and also classifying the identified visual events according to their type, dividing a period of time comprising the moments into typically disjunctive intervals such that an interval, which corresponds to a duration of the respective visual event, is assigned to each of the identified visual events, outputting the information defining the visual point in the scene image for selected moments from the intervals which are assigned to a visual event of the selected type, and, for each of the selected moments, storing a position in a reference image as image of the visual point which is defined for this moment, and also storing information, assigned to this position as attribute, about the duration of the visual event or interval to which this moment belongs, possibly together with further attributes with information about this visual event, e.g. about the beginning and end and/or an ongoing number of the visual event.

The device can thereby be equipped to divide the period of time into the intervals by an attribute, which indicates to which of the intervals or visual events this moment belongs, being assigned respectively to each of the moments. Here also, the reference image can again be identical or time-dependent for the different scene images.

Typically, the mentioned different types can differ from each other such that in particular visual events with and visual events without information intake are differentiated from each other—in the above-explained sense. The device is therefore equipped, in expedient embodiments, to recognise visual events in which information intake is effected, and visual events in which no information intake is effected as different types of visual events. Correspondingly, the mentioned visual events of the selected type expediently concern visual events with information intake.

In order to differentiate the different visual events and in particular to be able to identify as visual events in which information intake is effected, and as visual events in which no information intake is effected, the device can be equipped to identify the different visual events as a function of different speeds and/or amplitudes of an eye movement. In the case of expedient embodiments, the device is equipped in particular to recognise saccades as visual events without information intake and/or fixations and/or consequent movements as visual events with information intake.

Embodiments of the device are possible in which these are equipped with programming technology to image the visual points defined for the selected moments automatically onto positions in the reference image corresponding to these image points and to store the thus determined positions as images of the visual points. In addition, it can be equipped, for automatic imaging of the visual points onto the corresponding positions in the reference image, to implement the following steps:

identifying a plurality of characteristic features and locations of these features in the reference image by means of an algorithm for feature detection, identifying these features and determining locations of these features in the respective scene image by applying the same or a corresponding algorithm to the scene image, determining a transformation which images the locations of the features in the scene image onto the thus identified locations of the respective features in the reference image, and applying this transformation to the visual point identified in the respective scene image.

The transformation can concern for example a homography. In order that the image points are imaged into the reference image in the desired manner, the device can be equipped for instance to determine thereby respectively the transformation under the subsidiary condition that it concerns a homography with the required imaging properties with respect to the locations of the mentioned plurality of characteristic features.

It is also conceivable that the device requires a manual input for definition of the imaging of the visual points from the selected scene images or allows it as correction to an automatically suggested image. In this case, the device can be equipped, for each of the selected moments, to store the corresponding position in the reference image together with the attribute assigned to these positions respectively as a function of an input which defines the position and links this to the moment or to the scene image assigned to this moment. This input can be effected for example for each of the selected moments by a mouse click in the reference image illustrated for this purpose.

Also various possibilities are conceivable for selection of the moments. Thus the device can be equipped, for an input defining the selected moments as such—e.g. respectively by a mouse click on a time line on which the intervals are represented visually for this purpose—or for an automatic selection of these moments, by applying a specification defining these moments as a function of the intervals. This specification can for example define that the moments situated respectively centrally in the intervals are selected.

The device can be equipped in addition, provided that a plurality of moments are selected from the same interval which is assigned to one visual event with information intake, to store as image target assigned to this interval one of the positions or an average of the positions on which the visual points from the scene images, which are assigned to the moments selected from this interval, are imaged. The term average is not intended here to be able to designate only an arithmetic average but also for example a median.

It can be provided that the device has furthermore an eye tracker for detecting the gaze directions and a camera for recording the scene images. In this case, it concerns a device for eye tracking and evaluation of the results of this eye tracking. The eye tracker is then provided preferably with a mounting for fixing on or to the head of the test subject in order to allow free movement of the test subject in order that as realistic as possible information about his visual habits can be obtained. The camera for recording the scene images is typically a component of the eye tracker and can be carried by the same mounting. This facilitates calibration of the eye tracker.

Finally, the device can also have a camera for recording the reference image.

The initially described method can be implemented in particular with a device of the type described here. Conversely, the described device can be equipped, in addition to the essential or optional features mentioned here, also to implement any described embodiment or design of the initially described method.

BRIEF DESCRIPTION OF THE DRAWINGS

An embodiment of the invention is explained subsequently with reference to FIGS. 1 to 4. There are shown FIG. 1 in a schematic illustration, a device for eye tracking and for evaluating the results of this eye tracking, FIG. 2 a scene image recorded with this device and, adjacently on the right, a reference image likewise recorded with this device, it being illustrated by an arrow how a visual point identified in the scene image is imaged onto a corresponding position in the reference image, FIG. 3 in a diagrammatic illustration, a temporal course of a speed of an eye movement detected over an observation period of time with the device and FIG. 4 a time line on which this observation period of time is represented divided into a plurality of intervals, the intervals corresponding to different visual events identified with the device.

DETAILED DESCRIPTION

Figure 1:
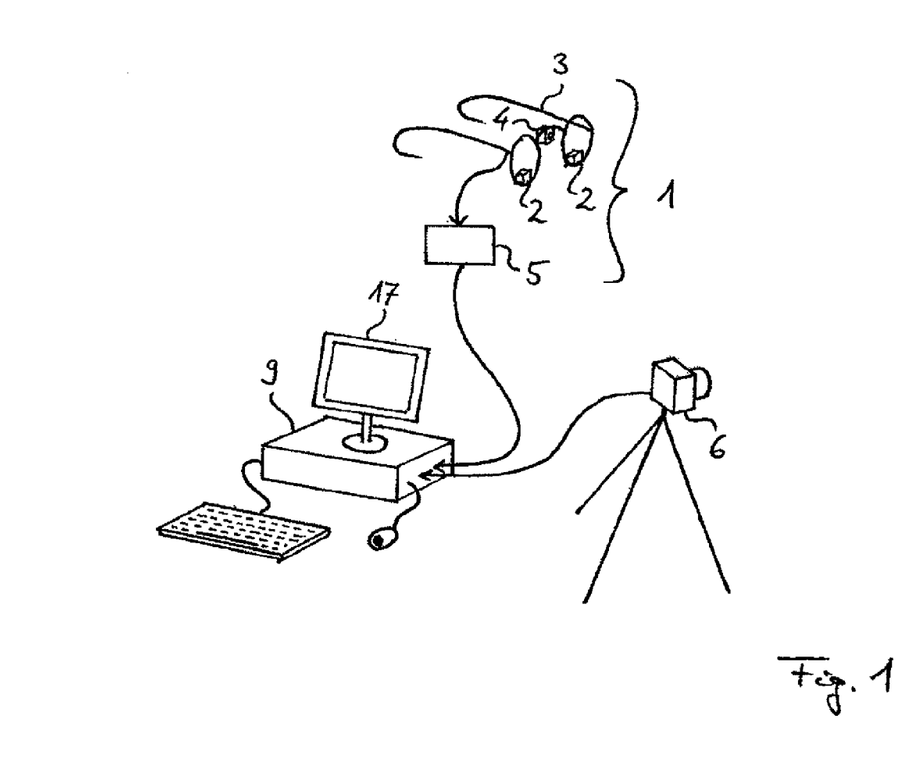

The device shown in FIG. 1 therefore concerns an arrangement which comprises an eye tracker 1 for eye tracking and is equipped in addition to evaluate results of the eye tracking obtained with this eye tracker 1 in a particularly expedient manner with low complexity.

The eye tracker 1 has two eye cameras 2 which are retained by a spectacle-like frame 3 and are directed towards two eyes of a test subject, not illustrated here, who wears the frame 3. In addition, the eye tracker 1 has a camera 4 retained by the same frame 3 for recording scene images, which camera is therefore disposed such that it moves jointly with the head of the test subject and such that a visual field of this camera 4 corresponds respectively approximately to a visual field of the test subject.

In addition, the eye tracker comprises a computing unit 5 which analyses an output of the eye camera 2 by means of image evaluation methods and consequently determines respectively a current gaze direction of the test subject at a large number of moments which are in succession at a narrow interval. For this purpose, the computing unit 5 can be equipped for example to determine a relative position of the pupils of the eyes for defined reflections on the cornea of the eyes, the reflections being able to be produced by correspondingly targeted illumination of the eyes. At each of the mentioned moments, the camera 4 records respectively a scene image assigned to this moment. These scene images therefore form successive frames of a film recorded with the camera 4. As a function of the determined gaze directions, the eye tracker 1 with the computing unit 5 now identifies a gaze point for each of the moments in the scene image assigned to this moment, the visual point—also termed "gaze point" or "focal point"—respectively designating the point in the scene image at which the test subject looks at the given moment.

In addition to the eye tracker 1, the device also has a further camera 6 with which a reference image is recorded. The reference image here concerns a photographic image, recorded from a defined perspective, of a scene which corresponds to the scene visible for the test subject and which is reproduced by the scene images. In the present case, this scene comprises shelves 7 which can concern for example merchandise shelves in a supermarket and in which a plurality of objects 8, e.g. various goods, are placed. Embodiments in which the camera 6 is provided by a video camera and the reference picture is time-dependent are also conceivable.

Finally, the device has an evaluation unit 9 for evaluating the results obtained with the eye tracker 1. These results concern information obtained in the described manner which defines, for each of the mentioned moments respectively, the gaze direction and the visual point detected at this moment which was identified in the scene image assigned to this moment.

Figure 2:
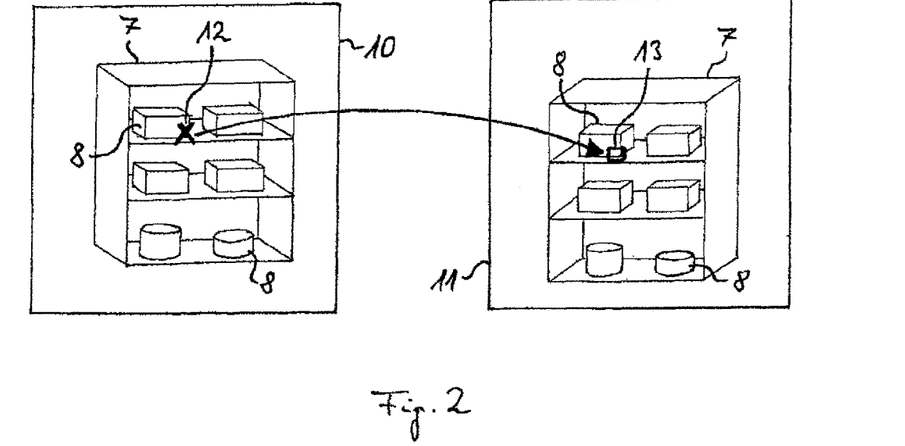

In FIG. 2 on the left, one of the scene images 10 recorded with the camera 4 is illustrated by way of example, whilst, on the right adjacently, the reference image 11 recorded with the camera 6 is shown. Instead of this photographic reference image 11, with a modification, also a schematic illustration of the scene could serve as reference image or an abstract reproduction in which characteristic features—e.g. the objects 8 placed in the shelves 7—which can be detected in the scene images are coded simply by their label or location. In the scene image 10, also the visual point 12 identified in this scene image 10 is represented in the form of an X.

For systematic evaluation of the results of the eye tracking, positions in the reference image 11 at which the test subject has looked should now be determined, these positions together with information about when and for how long the test subject has looked there should be stored. In FIG. 2, it is illustrated by an arrow how the visual point 12 is imaged for this purpose onto a position 13 corresponding to this visual point 12. In order that such imaging need not be implemented for each of the scene images in order to obtain the desired information, the process now takes place in the subsequently described manner.

Figure 3:
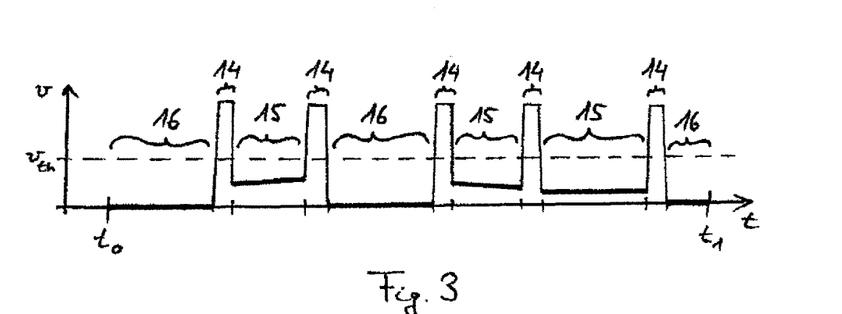

The evaluation unit 9 which is correspondingly equipped by programming technology detects a temporal change in gaze direction and/or in visual point by comparison of the information present for the successive moments relating to gaze direction and visual point. In FIG. 3, a thus determined temporal course of a speed v of an eye movement of the test subject within an observation period of time is illustrated, this observation period of time extending from $t_0$ to $t_1$. By comparison of the respectively determined speeds v with a threshold value $v_{th}$, different visual events are identified, and in fact saccades 14 in which the eyes move very rapidly so that $v > v_{th}$ applies, consequent movements 15 in which the eyes move substantially more slowly so that $v < v_{th}$ applies, and fixations 16 in which the eyes are still. The thus identified visual events are classified according to their type, in the example shown here i.e. respectively as saccade 14, consequent movement 15 or fixation 16. Saccades 14 are thereby recognised as a type of visual event in which no information intake is effected, whilst consequent movements 15 and fixations 16 are recognised as two types of visual events in which information intake is effected. However, it is not absolutely necessary for the described method to differentiate between consequent movements 15 and fixations 16. These two types of visual events can also be treated equally in the classification and are classified simply as events of the category of visual event with information intake.

The previous paragraph describes, by way of example, only a relatively simple method for identifying the different visual events. In order to recognise the visual events of a different type and in particular to differentiate visual events with information intake and visual events without information intake, further measures can be provided in addition, e.g. evaluation of a head movement detected at the same time by a head tracker or an IMU and/or analysis of image contents at the visual points 12 by evaluation of scene camera data. Alternatively or additionally to the described evaluation of the speed v of the eye movement, also, by comparison of the gaze directions and/or visual points 12 at the different successive moments, an amplitude of eye movements can be examined and the respective visual event can be identified and classified as a function of the detected amplitude. There is thereby termed amplitude, a greatest visual angle difference observed during an eye movement within a specific period of time. Thus for example microsaccades in which, despite great speeds, information intake should be taken into account, can be differentiated from actual saccades which can be treated as visual events without information intake. Also a detection of accelerations of the eyes serving additionally or instead for identifying the visual events is conceivable.

Figure 4:
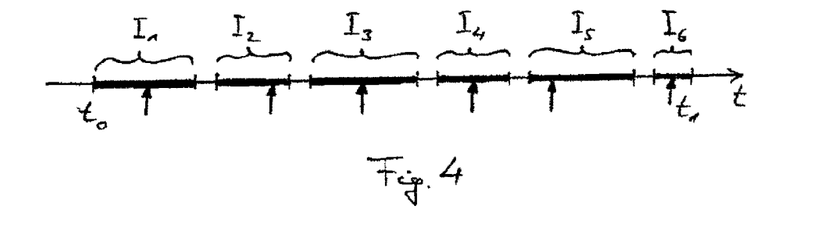

After identification and classification of the visual events, the mentioned observation period of time is divided by the evaluation unit 9 into disjunctive intervals so that an interval which corresponds to a duration of the respective visual event is assigned to each of the identified visual events. This is illustrated in FIG. 4 which shows a time line with the intervals. The intervals which are assigned to a fixation 16 or a consequent movement 15 are all designated there as intervals $I_1, I_2, I_3, I_4, I_5$ and $I_6$. At least these intervals $I_1$ to $I_6$ respectively comprise a plurality of the mentioned moments. Division of the observation period of time into intervals takes place by an attribute which indicates to which of the intervals or visual events this moment belongs being assigned respectively to each of the moments.

Now, for each of the intervals $I_1$ to $I_6$ which is assigned to a fixation 16 or a consequent movement 15, a moment is selected. The selected moments are illustrated in FIG. 4 respectively by an arrow. Selection of these moments can be effected, according to the embodiment, either automatically by applying a specification which defines the selected moments for example respectively as moments situated centrally in the respective interval or in any way optimally for the algorithm used, or manually by clicking on the desired moments on a time line reproduced for this purpose on a screen 17 of the evaluation unit 9. The time line can thereby be reproduced in the manner shown in FIG. 4 in a way which makes visible the relevant intervals $I_1$ to $I_6$.

The evaluation unit 9 is equipped such that, for each of the selected moments respectively, the scene image 10 assigned to this moment together with the visual point 12 identified therein is output on the screen 17, the reference image 11 being represented respectively in the manner shown in FIG. 2 next to or above or below the scene image 10 on the screen 17.

For each of these selected moments—and only for these moments—now the visual point 12 which is identified in the scene image 10 assigned to this moment, is imaged respectively onto the position 13 in the reference image 11 corresponding to this visual point 12. For each of the selected moments, the position 13 in the reference image 11, which corresponds to the visual point 12 assigned to this moment, is stored respectively as image of the visual point 12 together with information, assigned to this position 13 as attribute, about the visual event or about the interval to which this moment belongs. In particular the duration of the respective visual event or interval can be deduced from this information. In addition, also further attributes with information about this visual event, e.g. data about the beginning and end of the visual event, an ongoing number of the visual event or a meter reading in the case of multiple occurrence of the same position 13, can be stored respectively together with the position 13.

It can be provided that imaging of the visual points 12 from the selected scene images 11 is implemented manually. This can take place for example respectively by a mouse click after an input marking or a cursor has been guided to the respective position 13 in the reference image reproduced on the screen. The evaluation unit 9 is then therefore equipped to store, for each of the selected moments, the corresponding position 13 in the reference image 12 together with the attribute assigned to these positions 13 respectively as a function of an input which defines the position 13 and links this to the moment or to the scene image 10 assigned to this moment. The linking can thereby take place for example by the input defining the imaging always following directly upon the input selecting the moment.

The evaluation unit 9 can however also be equipped to image automatically the visual points 12 defined for the selected moments onto the positions 13 corresponding to these visual points 12 and to store the thus automatically determined positions as images of the visual points 12.

The illustration of the scene images 10 and of the reference image 11 can then serve for checking visually the automatic imaging of the visual point 12 in the reference image 11 if the automatically determined position 13 is also illustrated there visibly.

For automatic imaging of the visual points 12 onto the corresponding positions 13 in the reference image 11, the evaluation unit 9 can be equipped to identify a plurality of characteristic features, such as e.g. corners or edges, and locations of these features in the reference image 11 by means of an algorithm for feature detection and in addition to implement, for each of the selected moments, the respectively following steps:

identifying these characteristic features and determining locations of these features in the respective scene image 10 by applying the same algorithm to the scene image 10, determining a transformation which is a homography and images the locations of the features in the scene image 10 onto the thus identified locations of the respective features in the reference image 11, and applying this transformation to the visual point 12 identified in the respective scene image 10.

Differently from what is described above, it is also possible that a plurality of moments is selected for each of the intervals $I_1$ to $I_6$ or for some of these intervals $I_1$ to $I_6$ respectively in order to minimise imprecisions caused by faulty imagings. In every case, respectively significantly fewer moments are selected than the respective interval comprises. There is meant by the term "moment" here, of course always only moments from the final number of moments for which information about visual points is present. Provided a plurality of moments is selected from one interval for which respectively an imaging of the described type and therefore respectively one position 13 in the reference image 11 is defined, one of these positions 13 or an average or median of these positions 13 can be stored as imaging target assigned to this interval, together with the information about the duration of the interval which is assigned to this position 13 as attribute.

The information, which is determined and stored with relatively low complexity and therefore relatively rapidly, comprises all the data which are required for further evaluation of the results of the eye tracking and, for this purpose, can be evaluated statistically in the most varied of ways, by machine or also manually.

The invention claimed is:

1. A method for evaluating results of an eye tracking, these results being present or obtained as information which defines, for each of a large number of successive moments, respectively a gaze direction detected at this moment and a consequently identified visual point in a scene image assigned to this moment, the scene images being time-dependent such that the scene images assigned to the different moments are different and the method comprising the following steps:

evaluating a temporal change in the gaze direction and/or in the visual point and/or in an eye movement for identifying different visual events, at least two different types of visual events being recognized and the identified visual events being classified according to their type, dividing a period of time comprising the large number of successive moments into intervals such that an interval, which corresponds to a duration of the respective visual event, is assigned to each of the identified visual events, selecting a moment or proper subset of moments from each of the intervals which are assigned to the respective visual event of at least one selected type of visual event, and for the selected moment or proper subset of moments in each of the intervals, determine a location of the visual point identified in the scene image, respective visual points corresponding to the respective visual events of the respective intervals, and map a respective determined location of the respective visual point for the respective selected moment or proper subset of moments in each of the intervals onto a position in a reference image corresponding to the respective determined location of the respective visual point of the interval in the scene image.

2. The method according to claim 1, wherein, during evaluation, visual events in which information intake is effected, and visual events in which no information intake is effected, are recognized as different types of visual events, the selection respectively of precisely one of the moments or of a subset of the moments being effected for each of the intervals which are assigned to a visual event with information intake.

3. The method according to claim 1, wherein the different visual events are differentiated from each other by different speeds and/or amplitudes of an eye movement and/or in that saccades are recognized as visual events in which no information intake is effected, and/or in that fixations and/or consequent movements are recognized as visual events in which information intake is effected.

4. The method according to claim 1, wherein, for each of the intervals which are assigned to a visual event of a selected type, a position in the reference image together with information about the duration of the respective visual event is stored as imaging target, this position being chosen
   as the position onto which the visual point, which is defined for the moment selected from this interval, is imaged provided that precisely one of the moments is selected from this interval, or
   as one of the positions or an average of the positions onto which the visual points, which are defined for the moments selected from this interval, are imaged provided that a plurality of the moments is selected from this interval.

5. The method according to claim 1, wherein the scene images at the mentioned moments are recorded with a camera, the gaze directions being detected by means of an eye tracker which determines the visual points in the scene images as a function of the thus obtained information about the gaze directions, the camera being thereby worn preferably by the head of a test subject whose gaze directions are detected by the eye tracker.

6. The method according to claim 1, wherein the reference image is an image in a scene visible in the scene images which corresponds to a fixed perspective, or is an abstract reproduction or coding of characteristic features which can be detected in the scene images.

7. The method according to claim 1, wherein, for each of the selected moments, respectively the scene image assigned to this moment is output for manual implementation or for visual checking of the location of the visual point into the reference image.

8. The method according to claim 1, wherein the location of the visual points onto the positions is determined automatically by
   identifying a plurality of characteristic features and locations of these features in the reference image by means of an algorithm for feature detection,
   identifying these features and determining locations of these features in the respective scene image by applying the same or a corresponding algorithm to the scene image,
   determining a transformation which images the locations of the features in the scene image onto the corresponding locations in the reference image, and
   applying this transformation to the visual point identified in the respective scene image.

9. A device for evaluating results of an eye tracking, these results being present or being able to be read in or produced as information which defines, for each of a large number of successive moments, respectively a gaze direction detected at this moment and a consequently identified visual point in a scene image assigned to this moment, the scene images being time-dependent so that the scene images assigned to the different moments are different, and the device being equipped for implementing the following steps:
   evaluating a temporal change in the gaze direction and/or in the visual point and/or an eye movement for identifying different visual events and recognizing at least two different types of visual events and also classifying the identified visual events according to their type,
   dividing a period of time comprising the large number of successive moments into intervals such that an interval, which corresponds to a duration of the respective visual event, is assigned to each of the identified visual events,
   outputting the information defining the visual point in the scene image for a proper subset of selected moments from each of the intervals which are assigned to the respective visual event of at least one selected type, and
   for each of the selected moments in each of the intervals, determining a location of the visual point identified in the scene image, respective visual points corresponding to the respective visual events of the respective intervals, and mapping a respective determined location of the respective visual point for the respective proper subset of selected moments in each of the intervals onto a position in a reference image and also storing information assigned to this position as an attribute, about the duration of the visual event or interval to which this proper subset of selected moment belongs.

10. The device according to claim 9, wherein it is equipped to recognize visual events in which information intake is effected, and visual events in which no information intake is effected as different types of visual events.

11. The device according to claim 9, wherein it is equipped, for dividing the period of time into the intervals, to assign respectively an attribute, which indicates to which of the intervals or visual events this moment belongs, to each of the moments.

12. The device according to claim 9, wherein the device is equipped to identify the different visual events as a function of different speeds and/or amplitudes of an eye movement and/or to recognize saccades as visual events in which no information intake is effected and/or to recognize fixations and/or consequent movements as visual events in which information intake is effected.

13. The device according to claim 9, wherein it is equipped to image the visual points defined for the selected moments automatically onto positions in the reference image corresponding to these image points and to store the thus determined positions as the images of the visual points.

14. The device according to claim 13, wherein it is equipped, for automatic imaging of the visual points onto the corresponding positions in the reference image, to implement the following steps:
   identifying a plurality of characteristic features and locations of these features in the reference image by means of an algorithm for feature detection,
   identifying these features and determining locations of these features in the respective scene image by applying the same or a corresponding algorithm to the scene image, determining a transformation which images the locations of the features in the scene image onto the thus identified locations of the respective features in the reference image, and applying this transformation to the visual point identified in the respective scene image.

15. The device according to claim 9, wherein it is equipped, for each of the selected moments, to store the corresponding position in the reference image together with the attribute assigned to these positions respectively as a function of an input which defines the position and links this to the moment or to the scene image assigned to this moment.

16. The device according to claim 9, wherein it is equipped, for an input defining the selected moments as such or for an automatic selection of these moments, by applying a specification defining these moments as a function of the intervals.

17. The device according to claim 9, wherein it has furthermore an eye tracker for detecting the gaze directions with a camera for recording the scene images and/or a camera for recording the reference image.

18. The device further comprising to claim 9, further comprising an eye tracker for detecting the gaze directions, the eye tracker including a camera for recording the scene images and a mounting carrying said camera, the mounting being configured for being fixed on or to a head of a test subject.

19. A method for evaluating results of an eye tracking, these results being present or obtained as information which defines, for each of a large number of successive moments, respectively a gaze direction of a test subject detected at this moment and a thereby identified visual point in a scene image assigned to this moment, the scene images being time-dependent, wherein the scene images assigned to the different moments differ from each other due to a head movement of the test subject, the method comprising the following steps:

evaluating a temporal change in the gaze direction and/or in the visual point and/or in an eye movement for identifying different visual events, at least two different types of visual events being recognized and the identified visual events being classified according to their type, dividing a period of time comprising the large number of successive moments into intervals such that an interval, which corresponds to a duration of the respective visual event, is assigned to each of the identified visual events, selecting a moment or proper subset of moments from each of the intervals which are assigned to the respective visual event of at least one selected type of visual event, and for the selected moment or proper subset of moments in each of the intervals, determine a location of the visual point identified in the scene image, respective visual points corresponding to the respective visual events of the respective intervals, and map a respective determined location of the respective visual point for the respective selected moment or proper subset of moments in each of the intervals onto a position in a reference image corresponding to the respective determined location of the respective visual point of the interval in the scene image.

* * * * *